United States Patent [19]
Nakamura et al.

[11] Patent Number: 5,337,156
[45] Date of Patent: Aug. 9, 1994

[54] IMAGE OUTPUT DEVICE AND FACSIMILE MANAGEMENT REPORT OUTPUT METHOD

[75] Inventors: Toshifumi Nakamura; Gen Okabe; Susumu Yamamoto, all of Saitama, Japan

[73] Assignee: Fuji Xerox Co., Ltd., Tokyo, Japan

[21] Appl. No.: 901,178

[22] Filed: Jun. 19, 1992

[30] Foreign Application Priority Data

Jun. 22, 1991 [JP] Japan .................................. 3-177516

[51] Int. Cl.$^5$ .............................................. H04N 1/21
[52] U.S. Cl. ...................................... 358/404; 358/470
[58] Field of Search ............... 358/400, 401, 404, 407, 358/443, 444, 448, 462, 468, 486, 470, 296

[56] References Cited

U.S. PATENT DOCUMENTS

| | | | |
|---|---|---|---|
| 4,716,471 | 12/1987 | Yokomizo | 358/296 |
| 4,841,373 | 6/1989 | Asami et al. | 358/257 |
| 4,922,348 | 5/1990 | Gillon et al. | 358/407 |
| 4,969,049 | 11/1990 | Mitani et al. | 358/296 |
| 5,046,166 | 9/1991 | Takayanagi | 358/300 |
| 5,087,979 | 2/1992 | Schaertel | 358/296 |
| 5,130,809 | 7/1992 | Takayanagi | 358/300 |

FOREIGN PATENT DOCUMENTS 62-126430 8/1987 Japan .

Primary Examiner—Bentsu Ro
Attorney, Agent, or Firm—Finnegan, Henderson, Farabow, Garrett & Dunner

[57] ABSTRACT

A facsimile in which various kinds of management reports on its operation conditions are output. In the facsimile, when outputting a management report about the facsimile itself, the contents of the management report are once converted into code data and the code data are then stored in a code storage unit. After that, the stored code data are output from an image recording unit in the same manner as the code data of an image received from outside in the code storage unit is output.

4 Claims, 4 Drawing Sheets

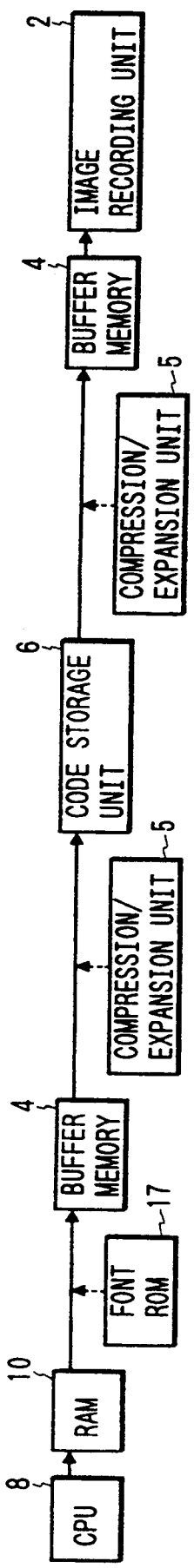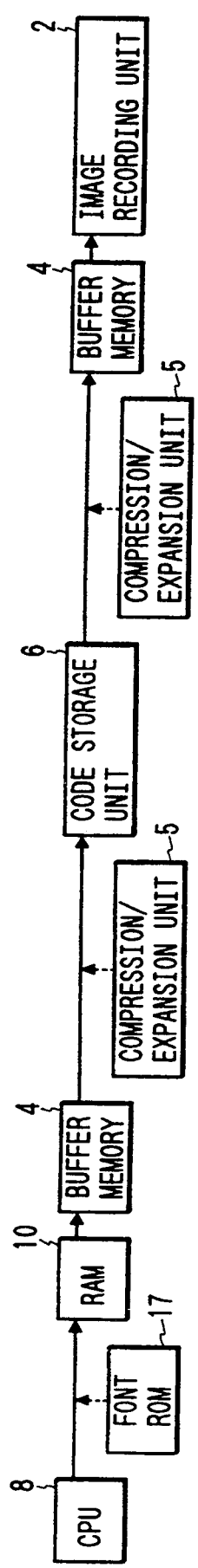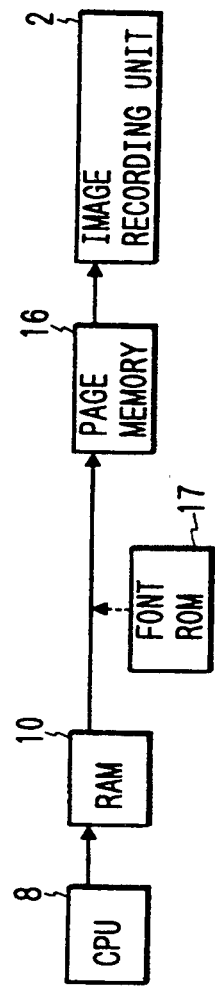
FIG. 1
FIG. 2
FIG. 3 PRIOR ART

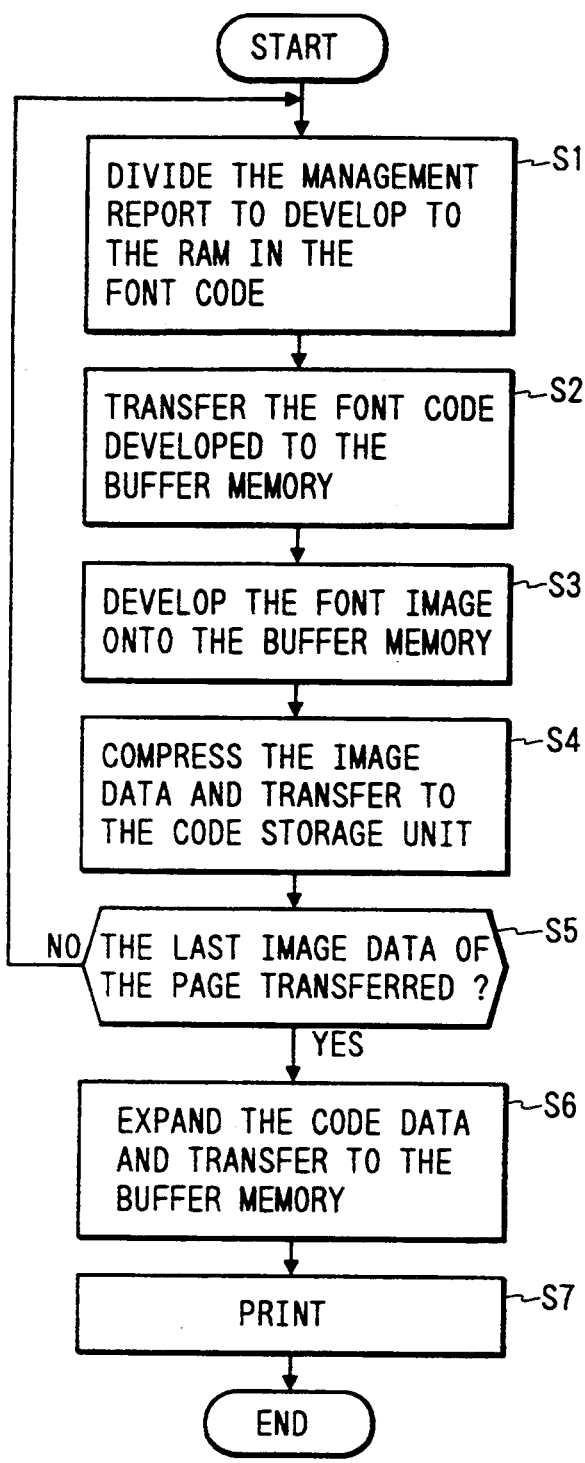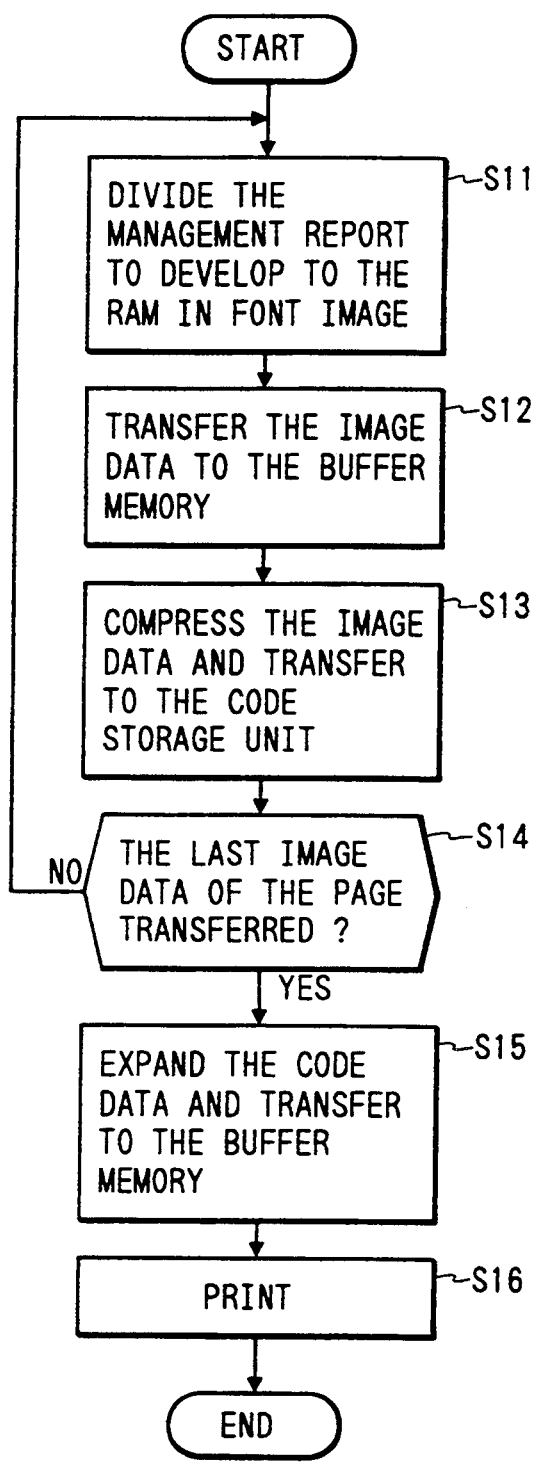

IMAGE OUTPUT DEVICE AND FACSIMILE MANAGEMENT REPORT OUTPUT METHOD

BACKGROUND OF THE INVENTION

1. Field of the Invention

Conventionally, there is known a facsimile in which various kinds of management reports on its operation conditions are output, for example, when an operator tried to transmit documents but could not, then there is output a management report with a message printed therein to the effect that the documents have not been transmitted. The present invention relates to a device for and a method of outputting various management reports of the above-mentioned type in a facsimile.

2. Description of the Related Art

Referring now to FIG. 7, there is shown a block diagram of a conventional facsimile including a page memory. In FIG. 7, reference character 1 designates an image reading unit, 2 an image recording unit, 5 a compression/expansion unit, 6 a code storage unit, 7 an operation panel, 8 a CPU (Central Processing Unit), 9 a ROM (Read Only Memory), 10 a RAM (Random Access Memory), 11 a modem, 12 a line control unit, 13 a communication line, 14 a bus, 15 a page memory control unit, 16 a page memory, 17 a font ROM, 18 an image data output control circuit, and 19 an image data input control circuit.

The image data input control circuit 19 controls the input of the image data of the image reading unit 1 when it is written from the image reading unit 1 into the page memory 16, while the image data output control circuit 18 controls the read-out of the image data of the page memory 16 when it is transmitted from the page memory 16 to the image recording unit 2. The page memory control unit 15 controls the page memory 16 into which address of the page memory 16 the image data is to be written or from which address thereof the image data is to be read out.

The image of a manuscript is read by the image reading unit 1 to generate image data which is then stored once in the page memory 16. Next, the image data is taken out of the page memory 16, encoded by the compression/expansion unit 5, and thus converted to code data. The encoded code data is stored in the code storage unit 6. The code storage unit 6 is composed of, for example, a DRAM (Dynamic Random Access Memory).

When the code data stored in the code storage unit 6 is transmitted to other facsimile, the code data is transmitted along a path including the code storage unit 6→modem 11→line control unit 12→communication line 13, and is then stored in a code storage unit provided in the other facsimile.

A printing operation in the image recording unit 2 is executed, for example, when the code data is transmitted thereto from the other facsimile. The code data in the code storage unit 6 is transmitted to the compression/expansion unit 5, in which the code data is decoded and converted into image data. The image data, after it is stored in the page memory 16 once, is transmitted to and printed by the image recording unit 2.

The operation panel 7 is a panel by means of which an operator gives various operation instructions. In the ROM 9, a program of an operation to be executed by the CPU 8 is stored. The RAM 10 provides an operation area necessary when the CPU 8 executes its operation.

By the way, in the conventional facsimile, there are output various kinds of management reports to report the operation conditions of the facsimile itself and, the outputting of the management reports has been executed in the following manner.

Referring now to FIG. 3, there is shown a view of an output process of a management report to be output in the conventional facsimile. In this figure, reference characters correspond to those shown in FIG. 7, respectively. The content of the management report is created in the CPU 8, while it is developed in a font code to the RAM 10. The content of the management report written in the font code, by calling from the font ROM 17 a font image which corresponds to the font code, is developed in the from of the image data onto the page memory 16. The developed image data is printed by the image recording unit 2 and is then output as a management report.

In addition, as an example of conventional references relating to a facsimile, there is known a reference which is disclosed in Japanese Patent Unexamined Publication No. Sho. 62-126430.

According to the above-mentioned conventional facsimile, due to provision of the page memory 16, the image data of the whole page constructing the management report can be all developed at a time and, when printing in the image recording unit 2, the image data can be printed continuously without being stopped in the middle of the page. However, the page memory requires a large number of memory elements and is expensive and, therefore, there has been a demand for reduced costs of the facsimile.

SUMMARY OF THE INVENTION

Consequently, it is an object of the present invention to provide an image output device in which the image data of the page is printed continuously without being stopped in the middle of the page even if an expensive page memory is not used.

In order to attain the above object, the present invention provides an image output device including a buffer memory for storing image data, the buffer memory having a capacity smaller than a quantity of image data corresponding to a page of a management report; font code data creating means for converting the contents of the management report into font codes to thereby create font code data; image data creating means for converting the font code data created by the font code data creating means into image data, and for storing the image data in the buffer memory; compression means for compressing the image data created by the image data creating means and stored in the buffer memory into encoded data; code storage means for accumulating and storing the encoded data compressed by the compression means at least in a quantity corresponding to a page of the management report; expansion means for expanding the encoded data stored in the code storage means to image data and for storing the image data in the buffer memory; recording means for recording an image onto a sheet in accordance with the image data expanded by the expansion means and stored in the buffer memory; and control means for controlling the image data creating means, the compression means and the code storage means in such a manner that the data quantity of the image date created by the image data creating means and stored in the buffer memory but not compressed by the compression means will never exceed the capacity of the buffer memory.

BRIEF DESCRIPTION OF THE DRAWINGS

FIG. 1 is an explanatory view showing the output process of a first embodiment of the invention;

FIG. 2 is an explanatory view showing the output process of a second embodiment of the invention;

FIG. 3 is an explanatory view showing the output process of a conventional facsimile management report output method;

FIG. 5 is a flow chart to explain the output operation of the first embodiment of the invention;

FIG. 6 is a flow chart to explain the output operation of the second embodiment of the invention.

DETAILED DESCRIPTION OF THE PREFERRED EMBODIMENTS

Figure 4:
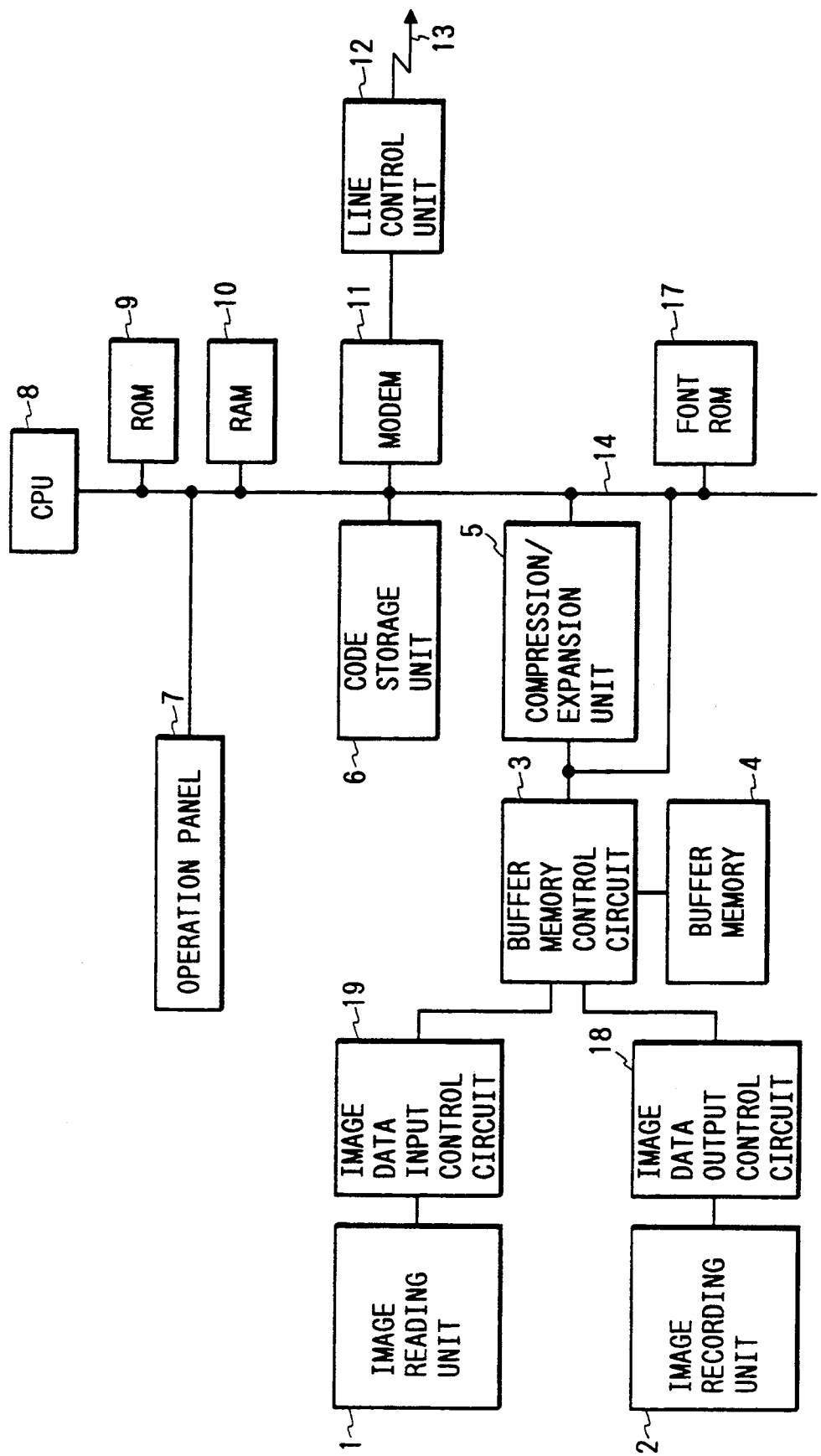
FIG. 4 is a block diagram showing a facsimile which is an image output device according to the invention.
Figure 7:
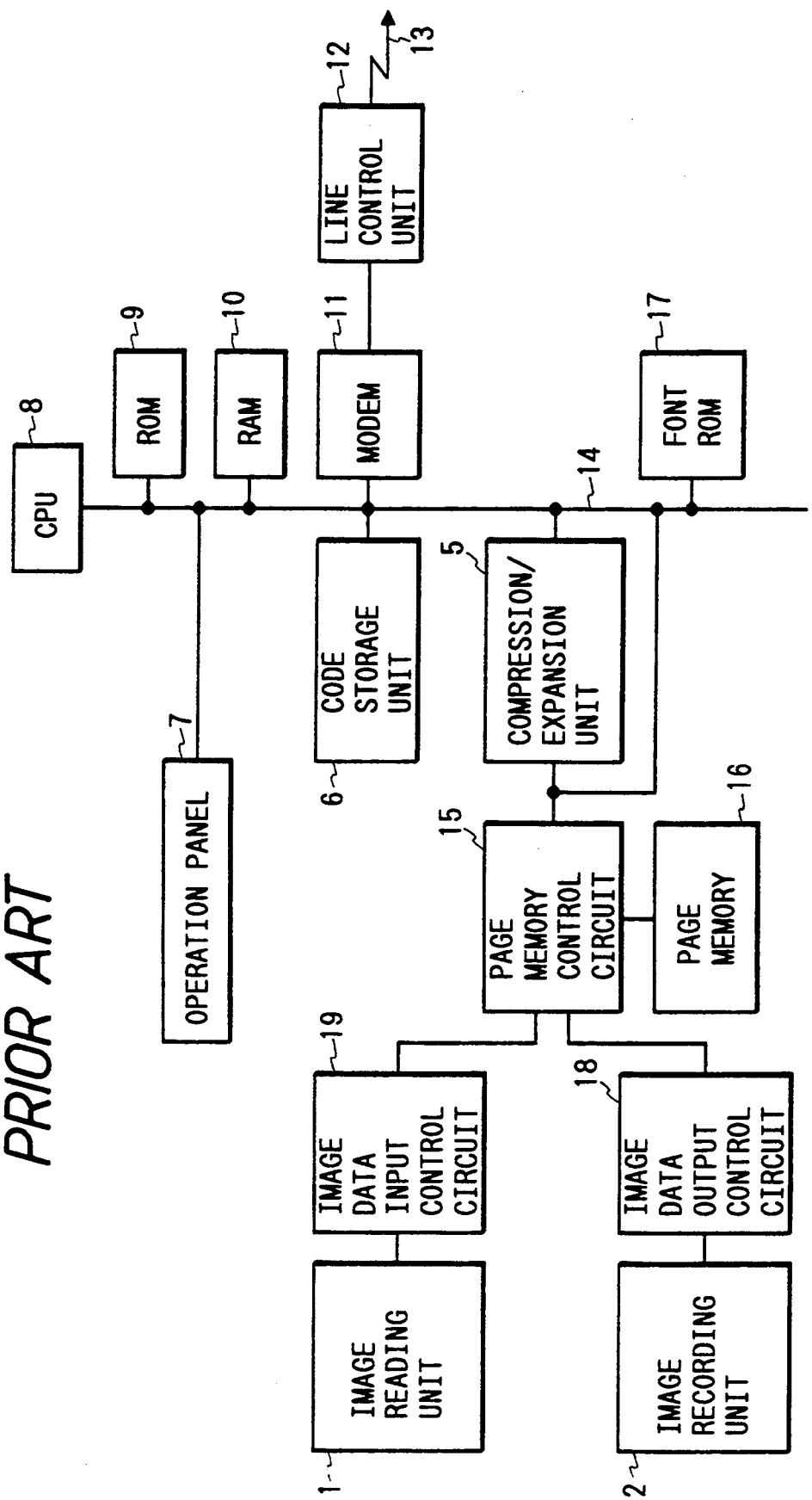
FIG. 7 is a block diagram showing a conventional facsimile including a page memory.

Description will hereunder be given in detail of the embodiments of the invention with reference to the accompanying drawings. Referring first to FIG. 4, there is shown a block diagram of a facsimile which is an image output device according to the invention. In FIG. 4, reference characters respectively correspond to those used in FIG. 7. Reference character 3 designates a buffer memory control circuit and 4 designates a buffer memory. As the image reading unit 1 and image recording unit 2, there are used those which are adapted to operate continuously without stopping in the middle of the page.

The buffer memory 4 is used as a ring buffer. The capacity of the buffer memory is determined in such a manner that, when writing image data from the image reading unit 1, the image data is prevented from being written before image data to be read out for compression by the compression/expansion unit 5 is read out, and also that, when reading out the image data to the image recording unit 2, the buffer memory 4 is prevented from being emptied before the last image data of a page is transmitted thereto from the compression/expansion unit 5.

The management report is created by the CPU 8 and is developed to the RAM 10. A case in which development to the RAM 10 is executed in a font code is referred herein to as a first embodiment, while a case in which development is executed in a font image is referred herein to as a second embodiment.

Referring now to FIG. 1, there is shown an explanatory view showing the output process of the first embodiment of the invention. In FIG. 1, reference characters respectively correspond to those used in FIG. 4. In FIG. 5, there is shown a flow chart for explaining an output operation to be performed in the first embodiment.

Step S1—The management report of the facsimile is created in the CPU 8 in a font code and it is developed to the RAM 10 as it is, that is, in the font code. The quantity of the font code to be developed must be in such a range that, when it is converted into a font image and is then transferred to the buffer memory 4, it can be stored in the buffer memory 4 without exceeding the capacity of the buffer memory 4. Since the capacity of the buffer memory 4 is smaller than that of a page memory, the buffer memory 4 is not able to develop an entire page of the management report at a time to the RAM 10 and, therefore, divides the entire page bit by bit before it is developed.

Step S2—The font code developed to the RAM 10 is transferred to the buffer memory 4.

Step S3—When transferring the font code to the buffer memory 4, the font code is converted into a font image (that is, image data) while referring to the font ROM 17 and the thus converted font image or image data is developed onto the buffer memory 4.

Step S4—The image data in the buffer memory 4 is compressed by the compression/expansion unit 5 to be converted into code data, and the code data is transferred to and stored in the code storage unit 6.

Step S5—Up to Step S4, the page of the management report has ben divided and developed bit by bit and has been transferred to the code storage unit 6. It is checked here that the last image data of the page has been transferred. If not, the operation goes back to Step S1.

Step S6—In and after this step, an operation is started to output to the image recording unit 2 the image data of the page of the management report stored in the form of code data in the code storage unit 6. At first, the code data is expanded by the compression/expansion unit 5 and the expanded image data is then transferred to the buffer memory 4.

Step S7—At the time when the buffer memory 4 is filled with the expanded image data, the image recording unit 2 is initiated to thereby start printing. This operation of the image recording unit 2 is similar to the operation thereof to be performed when an image signal received from outside by the code storage unit 6 is output from the image recording unit 2 and, therefore, the image recording unit 2 is able to output the management report in a continuous operation without stopping in the middle of the page.

Referring now to FIG. 2, there is shown an explanatory view showing the output process of the second embodiment of the invention, in which reference characters respectively correspond to those used in FIG. 4. Further, FIG. 6 is a flow chart for explaining the output operation to be performed in the second embodiment.

Step S11—In this embodiment, when data in a page of a management report made up in the CPU 8 is divided bit by bit and is developed to the RAM 10, the data is developed in a font image (image data) while referring to the font ROM 17.

Step S12—The image data developed is transferred to the buffer memory 4.

Step S13—The image data in the buffer memory 4 is compressed and is thereby converted into code data in the compression/expansion unit 5, and the code data is then transferred to and stored in the code storage unit 6.

Step S14—It is checked whether all data of the page of the management report have been transferred to and stored in the code storage 6. If not, then the operation goes back to Step S11.

Step S15—In and after this step, an operation is started to output to the image recording unit 2 the data of the page of the management report stored in the form of code data in the code storage unit 6. At first, the code data is expanded by the compression/expansion unit 5 and is then transferred to the buffer memory 4.

Step S16—At a time when the buffer memory 4 is filled with the expanded image data, the image recording unit 2 is initiated to thereby start printing. This operation of the image recording unit 2 is similar to the operation thereof to be performed when the image recording unit 2 outputs an image signal received from outside by the code storage unit 6 and, therefore, the image recording unit 2 is able to output the management report in a continuous operation without stopping in the middle of the page.

As has been described heretofore, according to the invention, when outputting a management report relating to a facsimile itself, the contents of the management report are once converted into code data before they are stored in the code storage unit. After stored, the code data are output from the image recording unit in the same manner as the image recording unit outputs an image signal received from outside by the code storage unit.

Although a facsimile to which the invention is applied has a buffer memory smaller in capacity than a page memory, it is one which allows the image reading unit and image recording unit to operate continuously by setting the capacity of the buffer memory to a suitable level. Thanks to this, the management report to be output in the above-mentioned manner can be output in a continuous operation from the image recording unit.

What is claimed is:

1. An image output device comprising:
   a buffer memory for storing image data, said buffer memory having a capacity smaller than a quantity of image data corresponding to a page of a management report;
   font code data creating means for converting the contents of the management report into font codes to thereby create font code data;
   image data creating means for converting the font code data created by said font code data creating means into image data, and for storing said image data in said buffer memory;
   compression means for compressing said image data created by said image data creating means and stored in said buffer memory into encoded data;
   code storage means for accumulating and storing said encoded data compressed by said compression means at least in a quantity corresponding to a page of the management report;
   expansion means for expanding said encoded data stored in said code storage means to image data and for storing said image data in said buffer memory;
   recording means for recording an image onto a sheet in accordance with said image data expanded by said expansion means and stored in said buffer memory; and
   control means for controlling said image data creating means, said compression means and said code storage means in such a manner that the data quantity of the image date created by said image data creating means and stored in said buffer memory but not compressed by said compression means will never exceed the capacity of said buffer memory.

2. The image output device according to claim 1, wherein said control means controls said image data creating means in such a manner that it divides and Converts said font code data two or more times into image data and also that it executes the next conversion after said image data created each time is compressed by said compression means.

3. A facsimile management report output method comprising the steps of:
   dividing data corresponding to a page of a management report and developing the divided data to a RAM in a font code;
   converting said font code developed to said RAM into a font image and transferring said font image to a buffer memory;
   converting said font image developed to said buffer memory into code data by a compression/expansion unit and transferring said code data to a code storage unit;
   converting said code data in said code storage unit into a font image by said compression/expansion unit and transferring said font image to said buffer memory; and
   outputting said font image in said buffer memory by means of an image recording unit which is adapted to operate continuously.

4. A facsimile management report output method comprising the steps of:
   dividing data corresponding to a page of a management report and developing said divided data to a RAM in a font image;
   transferring said font image developed to said RAM to a buffer memory;
   converting said font image developed to said buffer memory into code data by a compression/expansion unit and transferring said code data to a code storage unit;
   converting said code data in said code storage unit into a font image by said compression/expansion unit and transferring said font image to said buffer memory; and
   outputting said font image in said buffer memory by means of an image recording unit which is adapted to operate continuously.

* * * * *